(12) United States Patent
Shichino

(10) Patent No.: US 10,700,555 B2
(45) Date of Patent: Jun. 30, 2020

(54) POWER RECEPTION APPARATUS, CONTROL METHOD AND PROGRAM FOR POWER RECEPTION APPARATUS

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 16/021,884

(22) Filed: Jun. 28, 2018

(65) Prior Publication Data

US 2019/0013698 A1    Jan. 10, 2019

(30) Foreign Application Priority Data

Jul. 4, 2017   (JP) .................. 2017-130806

(51) Int. Cl.
| | |
|---|---|
| *H02J 7/02* | (2016.01) |
| *H02J 50/80* | (2016.01) |
| *H04B 5/00* | (2006.01) |
| *H02J 50/10* | (2016.01) |
| *H02J 50/12* | (2016.01) |
| *H02J 50/90* | (2016.01) |
| *H02J 50/60* | (2016.01) |

(52) U.S. Cl.
CPC ............. *H02J 50/12* (2016.02); *H02J 7/025* (2013.01); *H02J 50/10* (2016.02); *H02J 50/80* (2016.02); *H02J 50/90* (2016.02); *H04B 5/0025* (2013.01); *H04B 5/0031* (2013.01); *H04B 5/0037* (2013.01); *H02J 50/60* (2016.02)

(58) Field of Classification Search
CPC .. H02J 7/025; H02J 50/10; H02J 50/12; H02J 50/60; H02J 80/90; H04B 5/0025; H04B 5/0031; H04B 5/0037
USPC ........................................................ 307/104
See application file for complete search history.

(56) References Cited

FOREIGN PATENT DOCUMENTS

JP    2016007116 A    1/2016

*Primary Examiner* — Hal Kaplan
(74) *Attorney, Agent, or Firm* — Canon U.S.A., Inc. I.P. Division (57) ABSTRACT

A power reception apparatus including a power receiving unit receiving electric power wirelessly supplied from a power transmission apparatus, a member capable of being in at least a first state for attachment and detachment of a load unit and a second state restricting the attachment and detachment, wherein the load unit can consume the electric power received by the power receiving unit in a state where the load unit is attached to the power reception apparatus, a detection unit detecting that the member will be turned into the first state, and a transmission unit transmitting information for requesting the power transmission apparatus to stop power transmission when the detection unit detects that the member will be turned into the first state while the power receiving unit is receiving the power from the power transmission apparatus and the load unit is consuming the power received by the power receiving unit.

15 Claims, 4 Drawing Sheets

POWER RECEPTION APPARATUS, CONTROL METHOD AND PROGRAM FOR POWER RECEPTION APPARATUS

BACKGROUND

Field

The present disclosure relates to wireless power transmission.

Description of the Related Art

In recent years, technological development of a wireless power transmission system has been widely performed. Japanese Patent Laid-Open No. 2016-007116 discloses a power transmission apparatus and a power reception apparatus that perform the wireless power transmission via a power transmitting coil and a power receiving coil.

The power reception apparatus supplies the power received from the power transmission apparatus to a load such as a battery, and the load consumes the power. A relatively large counter electromotive force can be generated at the end of the power receiving coil when the load is electrically disconnected such as when the battery is removed, while power is wirelessly transmitted from the power transmission apparatus to the power reception apparatus. An overvoltage caused by a counter electromotive force is applied to the power receiving coil in such situations, and there is a concern that a malfunction may occur in a circuit or an electrical component connected to the power receiving coil.

SUMMARY

A power reception apparatus including a power receiving unit configured to receive electric power wirelessly supplied from a power transmission apparatus, a member capable of being in at least a first state for attachment and detachment of a load unit and a second state restricting the attachment and detachment of the load unit, wherein the load unit can consume the electric power received by the power receiving unit in a state in which the load unit is attached to the power reception apparatus, a detection unit configured to detect that the member will be turned into the first state, and a transmission unit configured to transmit information for requesting the power transmission apparatus to stop power transmission when the detection unit detects that the member will be turned into the first state while the power receiving unit is receiving the power from the power transmission apparatus and the load unit is consuming the power received by the power receiving unit.

Further features will become apparent from the following description of exemplary embodiments (with reference to the attached drawings).

DESCRIPTION OF THE EMBODIMENTS

Figure 1:
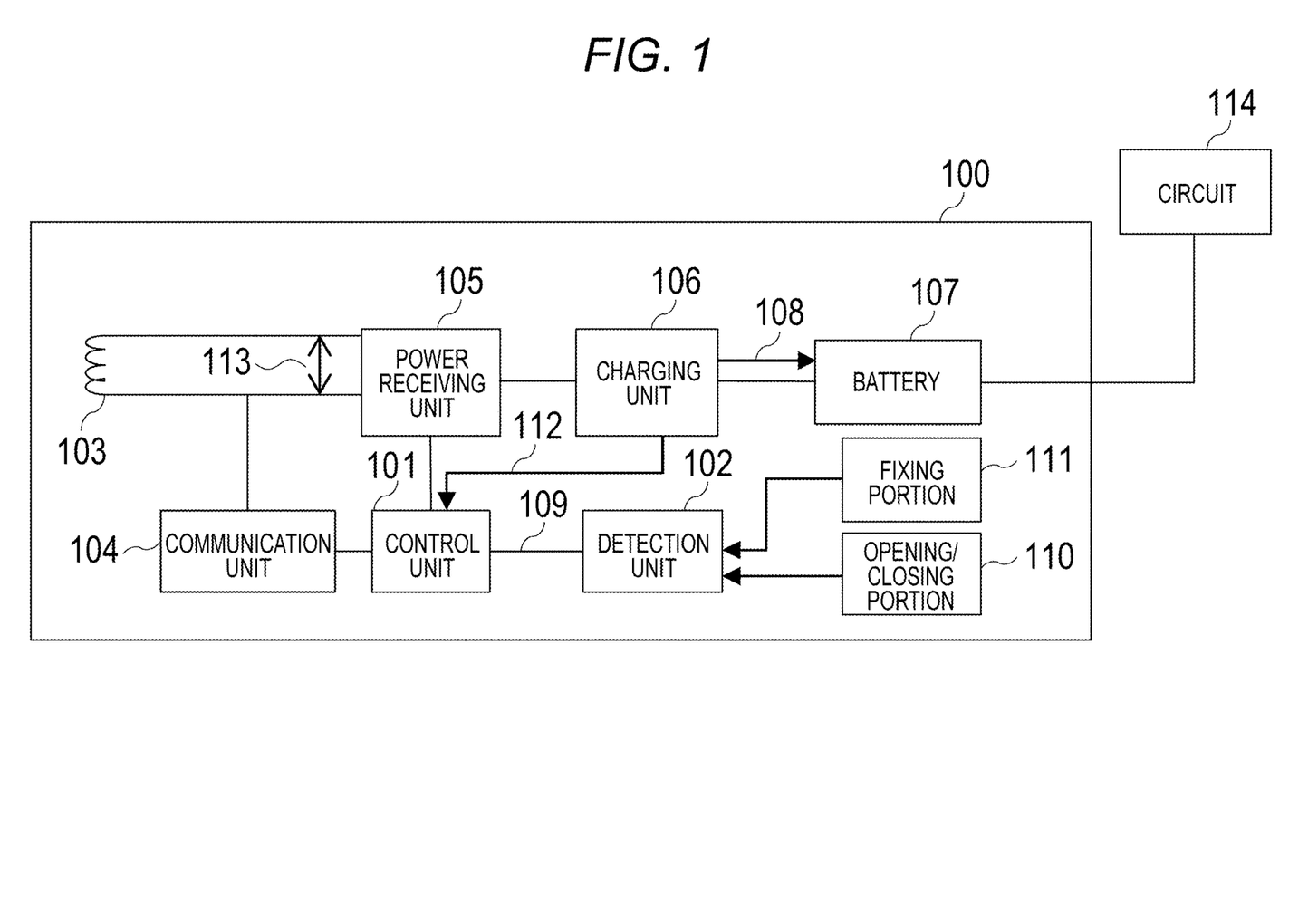
FIG. 1 is a configuration diagram of a power reception apparatus.

FIG. 1 is a diagram for describing a configuration of a power reception apparatus according to the present embodiment. It is assumed that the power reception apparatus 100 according to the present embodiment performs wireless power transmission complying with the Qi standard formulated by the standardizing organization of the non-contact charging standard Wireless Power Consortium (WPC). It should be noted that the power reception apparatus 100 may perform wireless power transmission not limited to the Qi standard but complying with other standards such as Air-Fuel.

The power reception apparatus 100 has a power receiving function of receiving electric power wirelessly supplied from a power transmission apparatus. The power reception apparatus 100 includes a control unit 101, a detection unit 102, a power receiving coil 103, a communication unit 104, a power receiving unit 105, a charging unit 106, a battery 107, an opening/closing portion 110, a fixing portion 111, and a circuit 114.

The control unit 101 controls the entire power reception apparatus 100. An example of the control unit 101 is a central processing unit (CPU) provided so as to be capable of communicating with memories such as a ROM and a RAM. The control unit 101 controls the entire apparatus by executing control programs stored in the memory. Note that the control unit 101 may be achieved by dedicated hardware. An example of the dedicated hardware is an ASIC or an FPGA.

The power receiving coil 103 receives the electromagnetic wave transmitted from the power transmitting coil of the power transmission apparatus. The communication unit 104 performs communication for control related to wireless power transmission with the power transmission apparatus. The communication unit 104 communicates by modulating and demodulating an electromagnetic wave for wireless power transmission. That is, the communication unit 104 performs communication so-called in-band communication using electromagnetic waves in the same frequency band as the electromagnetic waves used for wireless power transmission as wireless signals. The communication unit 104 performs a load modulation of the electromagnetic wave received by the power receiving coil 103 and communicates information to the power transmission apparatus. Further, the communication unit 104 demodulates electromagnetic waves subjected to amplitude modulation and/or phase modulation by the power transmission apparatus so as to communicate with the power transmission apparatus. It should be noted that the communication unit 104 may perform communication, that is so-called out-band communication using electromagnetic waves in a frequency band different from electromagnetic waves used for wireless power transmission, such as wireless communication compliant with Bluetooth (registered trademark) Low Energy (BLE) and the IEEE 802.11 standard.

The power receiving unit 105 received AC voltage from the power transmission apparatus via the power receiving coil 103 and converts (rectifies) the AC voltage into DC voltage. The power receiving unit 105 supplies the converted DC voltage to the charging unit 106 that charges the battery 107 as a load. The power reception apparatus 100 is provided with a capacitor for resonance between the power receiving coil 103 and the power receiving unit 105.

The charging unit 106 performs control for charging the battery 107 using electric power input from the power receiving unit 105. Further, the charging unit 106 determines whether the charging unit 106 is electrically connected to the battery 107 using a signal via a signal line 108. The charging unit 106 outputs a determination result on whether the charging unit 106 is electrically connected to the battery 107 to the control unit 101 via a signal line 112. The battery 107 may include a memory for storing identification information on the battery 107 and information on charging, and a communication section for exchanging information stored in the memory with the charging unit 106.

The battery 107 is a load unit, and stores electricity using electric power supplied from the power transmission apparatus. The electric power stored in the battery 107 is used for the operation of the power reception apparatus 100. The battery 107 is a power supply of the power reception apparatus 100 and provides power for operation of the circuit 114 which is a hardware component included in the power reception apparatus 100. Note that the battery 107 can be attached to and detached from the power reception apparatus 100.

The fixing portion 111 is a hardware component for attaching the battery 107 to the power reception apparatus 100. The fixing portion 111 has a function of physically fixing and holding the battery 107 in the power reception apparatus 100. The fixing portion 111 fixes and holds the battery 107 so that the battery 107 is electrically connected to the charging unit 106 and the circuit 114. The fixing portion 111 detachably releases the battery 107 to be fixed or held on the basis of a user handling. The opening/closing portion 110 has a function of converting the opening and closing of the cover for the battery 107 into an electric signal.

The detection unit 102 detects whether the fixing portion 111 fixes the battery 107. Further, the detection unit 102 detects whether the cover for the battery 107 is opened or closed based on the output from the opening/closing portion 110. The detection unit 102 outputs a detection signal indicating the detection result to the control unit 101 via a signal line 109. The circuit 114 operates using electric power that is the output of the battery 107.

An input voltage 113 having a voltage difference indicated by an arrow shown in FIG. 1 is applied to the power receiving unit 105. When the battery 107 is removed while the charging unit is charging the battery 107 using the power received by the power receiving unit from the power transmission apparatus, an object that consumes the power suddenly disappears. Therefore, a large AC voltage is generated at the position indicated by the arrow in FIG. 1, which may cause a malfunction of the peripheral circuit connected to the power receiving coil 103 such as the power receiving unit 105 or the charging unit 106.

Description is made assuming that the control unit 101 and the detection unit 102 operate at least with the electric power received by the power receiving coil 103, but may operate by electric power from another power supply. Further, the control unit 101, the power receiving unit 105, and the communication unit 104 may be configured as one integrated circuit.

Figure 2A:
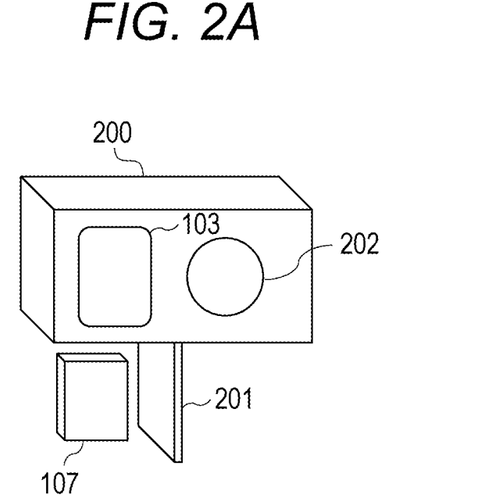
FIGS. 2A to 2E are configuration diagrams in a case where the power reception apparatus according to the present embodiment is applied to a camera.

FIGS. 2A to 2E show the configurations when the power reception apparatus 100 is a camera. In FIG. 2A, the camera 200 is a camera having the configuration of the power reception apparatus 100 shown in FIG. 1. The camera 200 has a cover 201 of a storage unit for the battery 107 that is opened and closed when the battery 107 is removed from the camera 200 or when the battery 107 is attached to the camera 200. The cover 201 is a part of the housing of the camera 200, and the user can attach and detach the battery 107 in a state in which the cover 201 is opened. Further, in order to attach and detach the battery 107, the cover 201 needs to be opened. Also, in a state where the cover 201 is closed, attachment and detachment of the battery 107 by the user is restricted. The power receiving coil 103 is disposed beside a lens 202. Further, in FIG. 2A, the power receiving coil 103 of the camera 200 is disposed in parallel with the surface of the housing of the camera 200, which has the lens 202. Further, the power receiving coil 103 is not disposed in parallel with the surface of the housing of the camera 200, which includes the cover 201. That is, when the battery 107 of the camera 200 is charged using the power supplied wirelessly from the power transmission apparatus, the plane of the housing parallel to the power receiving coil 103 needs to be placed on the power transmission apparatus. At this time, since the cover 201 is in a state of being touchable by the user, the user can open the cover 201 while charging the camera 200. Note that the position of the power receiving coil 103 is not limited to the abovementioned position, and the power receiving coil 103 has only to be disposed at a position where the power receiving coil 103 can receive power when the camera 200 is placed on the power transmission apparatus with one surface of the housing of the camera 200 facing downward.

Figure 2B:
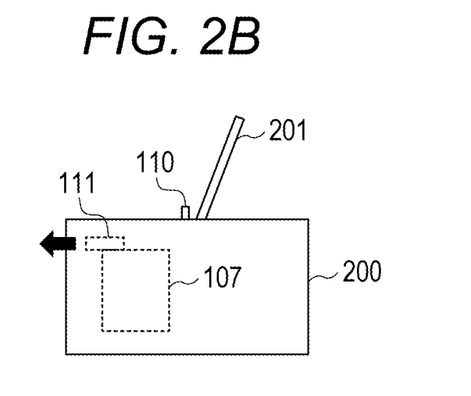

FIG. 2B is a diagram of the camera 200 viewed from another angle. In FIG. 2B, the battery 107 and the fixing portion 111 are depicted by broken lines. The battery 107 and the fixing portion 111 are inside the camera 200, and the broken lines indicate that the lines are actually invisible from the angle shown in FIG. 2B.

The case where the opening/closing portion 110 is composed of a switch to be pressed when the cover 201 is closed will be described as an example. In the present embodiment, when the cover 201 is opened, the opening/closing portion 110 outputs an HI signal, for example, a signal with a voltage value of 3.3 V to the detection unit 102, and in other cases the opening/closing portion 110 outputs a LOW signal, for example, a signal with 0 V. Here, the detection unit 102 controls so as to set the signal to be transmitted to the control unit 101 to HI when receiving the HI signal from the opening/closing portion 110, and controls to set the detection signal to LOW when receiving the LOW signal.

Further, the fixing portion 111 has a function of fixing the battery 107 and is mounted inside the camera. Therefore, the user can remove the battery from the camera by shifting the fixing portion 111 in the direction of the arrow shown in FIG. 2B after opening the cover 201. The fixing here means that the electrical contact point of the battery 107 and the electrical contact point of the charging unit 106 are connected. In other words, the charging unit 106 can charge the battery 107 when the battery 107 is fixed and cannot charge the battery when the battery is not fixed.

Figure 2C:
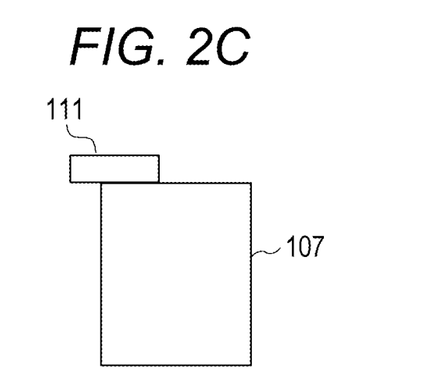
Figure 2D:
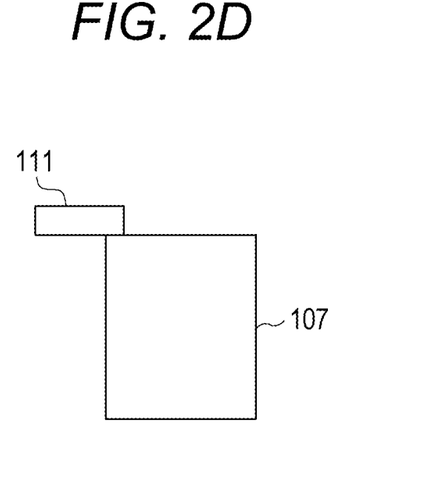
Figure 2E:
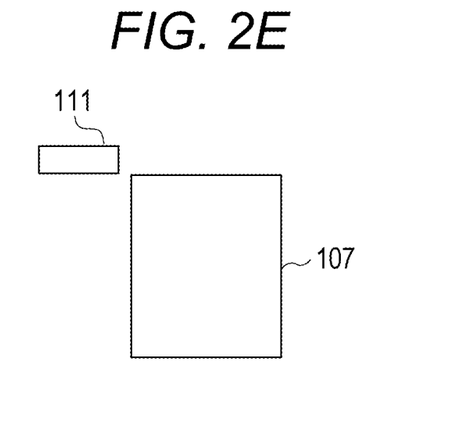

FIGS. 2C, 2D and 2E show the positional relationship between the fixing portion 111 and the battery 107. FIG. 2C shows a state in which the user has not handled the fixing portion 111, and the battery 107 is fixed and held in the camera 200. FIGS. 2D and 2E show the states in which the user has shifted the fixing portion 111 in the direction of the arrow in FIG. 2B. In the state of FIG. 2C, since the upper end of the battery 107 and the lower end of the fixing portion 111 are overlapped, the battery is fixed and the user cannot take out the battery. That is, when the fixing portion is in the state shown in FIG. 2C, the removal of the battery 107 by the user is restricted. In FIG. 2D, the user has moved the fixing portion 111 in the direction of the arrow in FIG. 2B, but since the upper end of the battery 107 overlaps the lower end of the fixing portion 111, the battery is in the state of being fixed. That is, the fixing portion 111 in FIG. 2D is in transition to a detachable state though taking out of the battery 107 is restricted. FIG. 2E shows a state in which the user has moved the fixing portion 111 in the direction of the arrow in FIG. 2B, and the upper end of the battery 107 and the lower end of the fixing portion 111 do not overlap each other. In this state, the battery 107 is not fixed, and the user can take out the battery 107. In other words, the state of the fixing portion 111 in FIG. 2E is the state in which the battery 107 is attachable and detachable by the user and the fixing portion 111 does not fix the battery 107. Further, in order to attach and detach the battery 107, the fixing portion 111 needs to be in the state shown in FIG. 2E.

Description is given assuming that the fixing portion 111 according to the present embodiment outputs the LOW signal to the detection unit 102 in the state of FIG. 2C in which the user has not handled, and outputs the HI signal in the state of FIG. 2D or 2E in which the user has handled. Here, when receiving the HI signal from the fixing portion 111, the detection unit 102 sets the signal to be transmitted to the control unit 101 to HI. Further, when receiving the LOW signal from the fixing portion 111, the detection unit 102 controls to set the signal to be transmitted to the control unit 101 to LOW.

Figure 4:
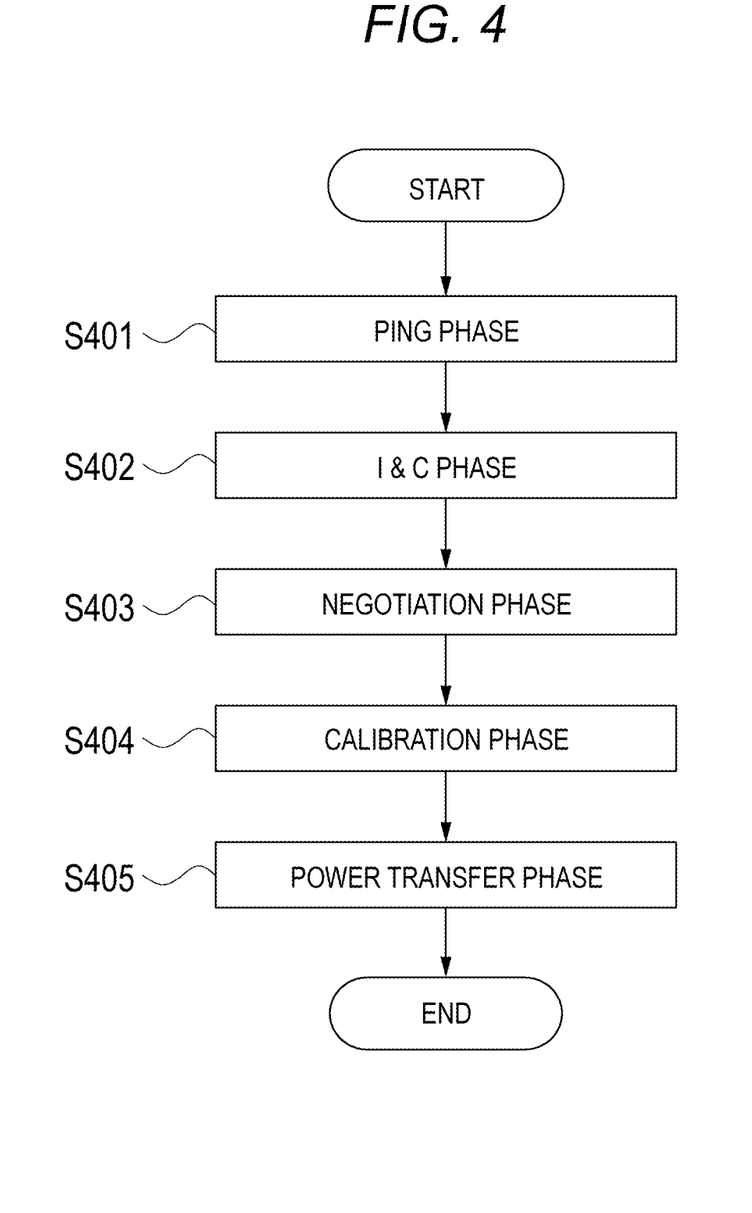
FIG. 4 is a state transition diagram of the power reception apparatus.

FIG. 4 is a diagram showing a state transition of the power receiving process of the power reception apparatus 100. The power reception apparatus 100 performs a state transition in accordance with the WPC standard. When receiving transmitted power sufficient for activating the control unit 101 and the communication unit 104 (referred to as "digital ping"), the power reception apparatus 100 activates the control unit 101 and the communication unit 104. When activating the control unit 101 and the communication unit 104, the power reception apparatus 100 shifts to the ping phase (S401). In the ping phase, the power reception apparatus 100 notifies the power transmission apparatus about the strength of the received power as a signal strength packet. When transmitting the signal strength packet, the power reception apparatus 100 shifts to the identification & configuration (I & C) phase (S402).

The power reception apparatus 100 transmits to the power transmission apparatus an identification packet that stores the identification information of the power reception apparatus 100 and a configuration packet that stores an upper limit value of the received power, and the like in the I & C phase. Upon transmitting these pieces of information, the power reception apparatus 100 shifts to the negotiation phase (S403). In the negotiation phase, negotiation on power transmission power is performed between the power transmission apparatus and the power reception apparatus 100. When the negotiation is completed, the power reception apparatus 100 shifts to the calibration phase (S404). In the calibration phase, the power reception apparatus 100 determines a correction value of the power with a low load and a high load electric energy for detecting a foreign substance. It is to be noted that the foreign substance is a matter that is not an object of the power receiving, and is, for example, a metal piece or the like. When the processing in the calibration phase is completed, the power reception apparatus 100 shifts to the power transfer phase (S405). In the power transfer phase, the power receiving unit 105 of the power reception apparatus 100 starts outputting the received power to the charging unit 106.

Figure 3:
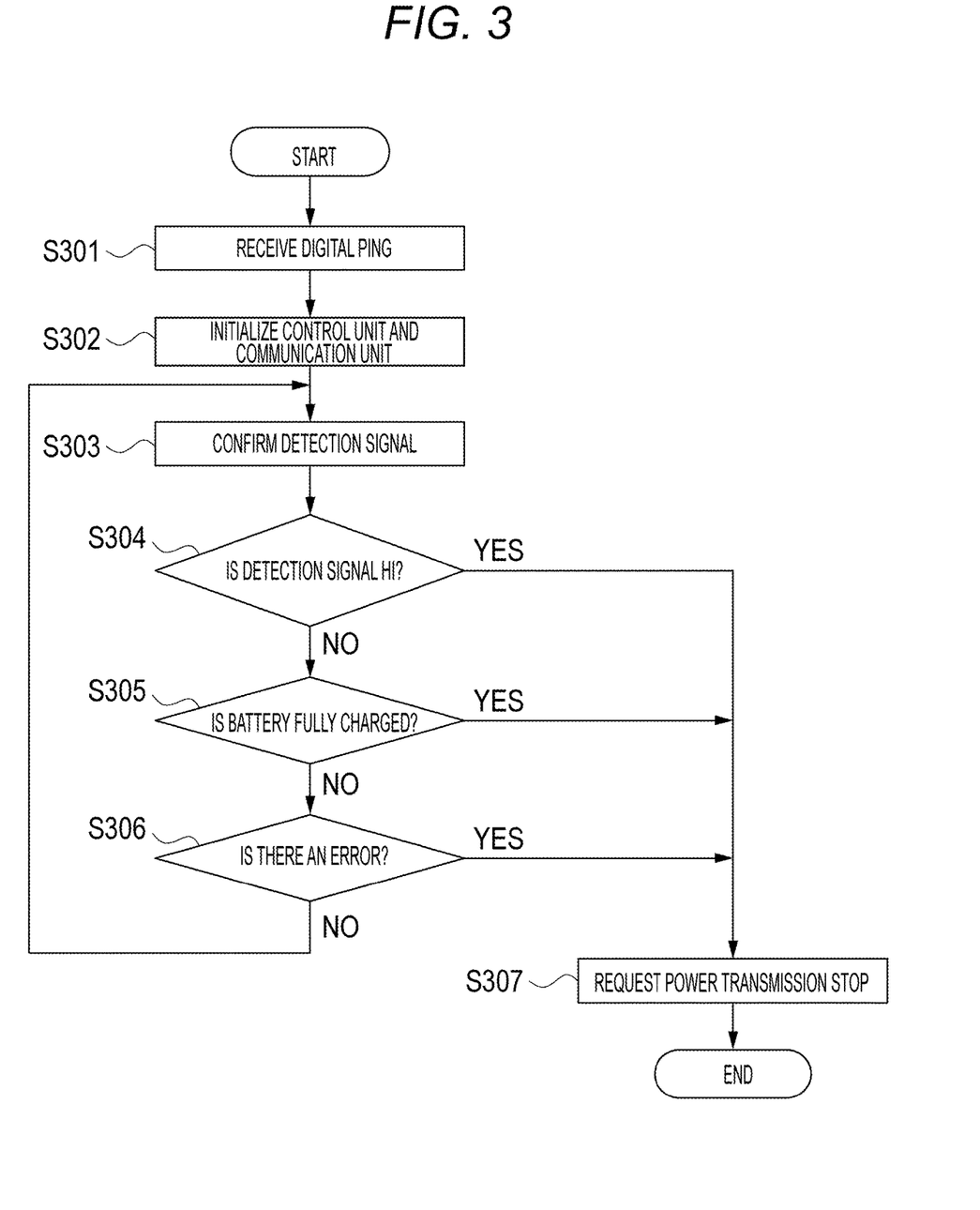
FIG. 3 is a flowchart of processing of the power reception apparatus to stop power transmission.

Subsequently, the power transmission stop process of the power reception apparatus 100 will be described with reference to a flowchart shown in FIG. 3. Note that the flowchart shown in FIG. 3 is achieved by the control unit 101 executing the program stored in the memory so as to perform operation on information and to control each hardware component. Note that at least a part of the flowchart shown in FIG. 3 may be fulfilled by hardware. An example of hardware is an ASIC. Further, in the case of the flow chart fulfilled by hardware, a dedicated circuit may be automatically generated on the FPGA from a program for implementing each step, for example, by using a predetermined compiler. The FPGA stands for field programmable gate array. Further, a gate array circuit may be formed similarly to the FPGA so as to achieve the flowchart as hardware. The flowchart shown in FIG. 3 is started by reception of the digital ping. Note that the processing shown in FIG. 3 is executed in parallel with the power receiving processing shown in FIG. 4.

The power receiving unit 105 receives the digital ping from the power transmission apparatus (S301). The power reception apparatus 100 starts up in a state in which the control unit 101 and the communication unit 104 have been initialized using electric power supplied as the digital ping (S302). The control unit 101 confirms the detection signal output from the detection unit 102 (S303) and determines whether the detection signal is HI (S304). When the detection signal is HI, the control unit 101 transmits a request for a power transmission stop to the power transmission apparatus via the communication unit 104, and stops power transmission of the power transmission apparatus (S307). That is, the power reception apparatus 100 determines whether the cover 201 has been opened, when the wireless power transmission from the power transmission apparatus is started. Then, when the power reception apparatus 100 detects that the cover 201 for the battery 107 is opened, the control unit 101 transmits information requesting a power transmission stop to the power transmission apparatus via the communication unit 104.

As described above, when the power reception apparatus 100 is in the power transfer phase, for example, and the opening of the cover 201 is detected while the battery 107 is being charged, the power reception apparatus 100 causes the power transmission apparatus to stop the power transmission. Even if the battery 107 is taken out thereafter and the battery 107 and the charging unit 106 are electrically disconnected, power transmission has been already stopped, so that the input voltage 113 of the power receiving unit 105 does not become excessive. When the power reception apparatus 100 includes an operation section such as a button or a switch for opening the cover 201, the power reception apparatus 100 may make power transmission stopped by detecting that the operation is carried out on the operation section. Note that the operation section for opening the cover 201 is not limited to physical buttons and switches, and may be an operation section such as a button displayed on a display unit included in the power reception apparatus 100.

On the other hand, when the detection signal is LOW in S304, the power reception apparatus 100 determines whether the battery 107 is fully charged (S305). When the battery 107 is fully charged, the power reception apparatus 100 transmits information requesting the power transmission apparatus to stop power transmission to the power transmission apparatus via the communication unit 104 (S307). Further, the power reception apparatus 100 determines whether an error of the power reception has occurred such as a temperature excess of the power receiving unit 105 over a predetermined temperature or failed communication by the communication unit 104 (S306). When detecting an error, the power reception apparatus 100 transmits information requesting the power transmission apparatus to stop power transmission to the power transmission apparatus via the communication unit 104 (S307).

When not being able to detect that the cover 201 is opened, the battery is fully charged, or an error has occurred, the power reception apparatus 100 performs the processing from S303 again.

In this manner, the control unit 101 is configured to request the power transmission apparatus to stop power transmission based on the detection signal without being synchronized with the state transition of the WPC in FIG. 4 when power transmission from the power transmission apparatus is started. Thus, for example, even when the power reception apparatus 100 to which the battery 107 is not attached is placed in the power transmission range of the power transmission apparatus, the power reception apparatus 100 does not shift to the power transfer phase. Therefore, the cases where the excessive input voltage 113 is applied to the power receiving unit 105 are reduced. Also, for example, even in a situation from the ping phase to the calibration phase, if there is a possibility that the battery 107 will be removed, the power transmission apparatus can be made to stop power transmission. Accordingly, shifting to the power transfer phase can be restricted while there is risk that the battery 107 is removed. In addition, it is configured that even when the battery 107 is already being charged in the power transfer phase, if the opening of the cover 201 is detected, the power transmission apparatus is requested to stop power transmission. Thus, since charging is suppressed in a state where there is a risk that the battery 107 is removed, cases where the excessive input voltage 113 is applied are reduced.

The power reception apparatus 100 may be configured so as not to request the power transmission apparatus to stop power transmission at the timing of detecting the opening of the cover and configured so as to request the apparatus to stop power transmission at the timing when the user handling is performed on the fixing portion 111. In other words, when there is a possibility that the battery 107 and the charging unit 106 are electrically disconnected, such as when the fixing portion 111 is moved or the fixing portion 111 does not fix the battery 107 as shown in FIGS. 2D and 2E, the detection signal becomes HI, and the power transmission stop is requested before the electrical disconnection.

In particular, a request for the power transmission stop is made in a state where the fixing portion 111 has been moved away in comparison with FIG. 2C although the battery 107 is fixed as shown in FIG. 2D, that is, in a state where the possibility that the battery 107 is electrically disconnected is high. Thereby, the application of an overvoltage can be prevented that exceeds a predetermined withstand voltage of the circuit electrically connected to the power receiving coil 103, which is caused by the electrical disconnection of the load during power reception. In addition, according to the present embodiment, the application of an overvoltage can be prevented, which exceeds a predetermined voltage value set as a threshold due to the electrical disconnection of the load during power reception. Thus, according to the present embodiment, malfunctions such as failure of the circuit due to application of overvoltage can be prevented.

As described above, according to the present embodiment, when there is a possibility that the load is electrically disconnected during power reception, power transmission is stopped before occurrence thereof. In other words, the overvoltage can be prevented from being applied due to the electrical disconnection of the load during power reception.

OTHER EMBODIMENTS

In the above-described embodiment, an example is described in which a request for the power transmission stop is made according to the handling of the cover for the battery 107 or the handling of the fixing portion 111. Various embodiments of the present disclosure are not limited to this and the power reception apparatus 100 may request the power transmission to be stopped upon detecting another event that may occur before the load such as the battery 107 is taken out.

For example, before the battery 107 is taken out, there is a possibility that the user touches the power reception apparatus 100 so that the power reception apparatus 100 is moved a little. Accordingly, the power reception apparatus 100 may request the power transmission stop when detecting its own movement based on the output of an acceleration sensor or the like. Also, there is a possibility that the user touches a part of the power reception apparatus 100 before removing the battery 107. Thus, the power reception apparatus 100 may request the power transmission stop when receiving an input through the touch panel or the operation section. Further, the power reception apparatus 100 may request the power transmission stop when the power is turned on during charging. In this manner, the power reception apparatus 100 may request the power transmission apparatus to stop power transmission by detecting the preparatory action for electrically removing the load consuming the power received by the power receiving unit 105.

In addition, the fixing portion 111 may be configured so that the battery 107 is put into the power reception apparatus 100 and fixed by being pushed in once, and taken out by being pushed in again. At this time, the detection unit 102 may be configured to determine whether the push-in handling is for fixing the battery 107 or for taking out the battery 107, and when the handling is for taking out the battery 107, the stop of power transmission may be requested.

Further, the process of requesting the power transmission stop in S307 may be an operation for notification of information indicating an error of the power reception apparatus 100. Upon receiving the information indicating an error from the power reception apparatus 100, the power transmission apparatus stops power transmission. Thus, even by notification of the information indicating an error, the power reception apparatus 100 can prevent the application of the overvoltage caused by the electrical disconnection of the load during the power reception. For example, the power reception apparatus 100 may indicate that there is a problem with the battery and may transmit the information element "Battery Failure" defined in the Qi standard to the power transmission apparatus as information requesting a power transmission stop. In addition, the power reception apparatus 100 may transmit the information requesting a power transmission stop together with information indicating an error as an error code included therein. Further, when notifying the power transmission apparatus of the error code, the power reception apparatus 100 may display information on the transmitted error code on the display unit of the power reception apparatus 100. For example, when transmitting information indicating that there is a problem with the battery to the power transmission apparatus, the power reception apparatus 100 may display information indicating that power transmission (charging) is stopped due to a battery problem. In this case, the power reception apparatus 100 may display a remedial measure such as "Please check the battery", "Please close the lid for the battery" or "Do not remove the battery while charging". Also, the power transmission apparatus may perform these displays. Further, the power reception apparatus 100 may notify the user that an error has occurred, by a method other than display, such as a sound or a vibration. In this way, since the power reception apparatus 100 or the power transmission apparatus displays information on the error, the user can know the reason for suspending power transmission. In addition, since the power reception apparatus 100 or the power transmission apparatus displays information on remedial measures for restarting charging, the user can recognize a process necessary for restarting charging.

Further, the detection unit 102 may operate by supply of power from the battery 107, or may operate with output from the power receiving unit 105. When operating with the output from the power receiving unit 105, the detection unit 102 can execute the processing shown in FIG. 3 even when there is no residual capacity of the battery 107.

In the above embodiment, the battery 107 is taken as an example of the load consuming the power received by the power receiving unit 105, but a load different from the battery 107 may consume the power received by the power receiving unit 105. For example, a load that can be attached to and detached from the power reception apparatus 100 and that operates by consuming power received by the power receiving unit 105, such as a motor, an IC, a chip for communication and operation on information, or another circuit may be the example. In this case, when a cover for covering a motor, an IC, a chip for communication and operation on information, or a terminal connecting other circuit is opened, the power reception apparatus 100 transmits a request for stopping power transmission to the power transmission apparatus.

Also, an example is described in which the movement detection of the cover or the fixing portion 111 for the battery 107 that is a load consuming the power received by the power receiving unit 105 is a trigger for requesting the power transmission apparatus to stop power transmission. The present disclosure is not limited to this configuration, however, and a request for a power transmission stop may also be issued to the power transmission apparatus using a detection of a state change of a member necessary for removing the battery 107 that is a load consuming power received by the power receiving unit 105 as a trigger.

The power transmission method of the wireless power transmission system according to the present embodiment is not particularly limited. A magnetic field resonance method may be used in which electric power is transmitted by coupling due to resonance (sympathetic vibration) of a magnetic field between a resonator (resonance element) of a power transmission apparatus and a resonator (resonance element) of a power reception apparatus. In addition, an electric power transmission system using an electromagnetic induction method, an electric field resonance method, a microwave method, a laser, or the like may be employed.

Further, the power reception apparatus 100 may be an image input apparatus such as an imaging apparatus (a camera, a video camera, etc.), a scanner, or the like, or alternatively an image output apparatus such as a printer, a copier, a projector, or the like. In addition, the power reception apparatus 100 may be a storage device such as a hard disk device or a memory device, or may be an information processing device such as a personal computer (PC) or a smartphone.

Various embodiments of the present disclosure may be implemented by processing in which a program that fulfills one or more functions of the above embodiments is provided to a system or an apparatus via a network or a storage medium and one or more processors in the computer of the system or apparatus reads and executes the program. Further, various embodiments of the present disclosure may also be implemented by a circuit (e.g., ASIC) that fulfills one or more functions.

According to the above-described embodiment, a problem caused by electrically disconnecting a load during power reception can be prevented.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-130806, filed Jul. 4, 2017, which is hereby incorporated by reference herein in its entirety.

What is claimed is:

1. A power reception apparatus comprising:
   a power receiving unit configured to receive electric power wirelessly supplied from a power transmission apparatus;
   a member capable of being in at least a first state for attachment and detachment of a load unit and a second state restricting the attachment and detachment of the load unit, wherein the load unit can consume the electric power received by the power receiving unit in a state in which the load unit is attached to the power reception apparatus;
   a detection unit configured to detect that the member will be turned into the first state; and a transmission unit configured to transmit information for requesting the power transmission apparatus to stop power transmission when the detection unit detects that the member will be turned into the first state while the power receiving unit is receiving the electric power from the power transmission apparatus and the load unit is consuming the electric power received by the power receiving unit.

2. The power reception apparatus according to claim 1, wherein the load unit is a battery that stores the electric power received by the power receiving unit.

3. The power reception apparatus according to claim 1, wherein the load unit is a motor that operates with the electric power received by the power receiving unit.

4. The power reception apparatus according to claim 1, wherein
the member is a fixing portion that fixes the load unit to the power reception apparatus,
the first state is a state in which the fixing portion does not fix the load unit,
the second state is a state in which the fixing portion fixes the load unit,
the detection unit detects that handling on the fixing portion has been performed for detaching the load unit from the power reception apparatus, and
the transmission unit transmits the information when the detection unit detects that the handling has been performed on the fixing portion for removing the load unit from the power reception apparatus.

5. The power reception apparatus according to claim 1, wherein
the member is a cover of a storage unit of the power reception apparatus that stores the load unit,
the first state is a state in which the cover is opened,
the second state is a state in which the cover is closed,
the detection unit detects opening of the cover, and
the transmission unit transmits the information when the opening of the cover is detected by the detection unit.

6. The power reception apparatus according to claim 1, wherein when the load unit is detached from the power reception apparatus, the power receiving unit becomes in a state of being electrically unconnected with the load unit.

7. The power reception apparatus according to claim 1, wherein the power reception apparatus is a camera.

8. The power reception apparatus according to claim 1, wherein the power receiving unit receives the electric power in accordance with a Qi standard.

9. The power reception apparatus according to claim 1, wherein the transmission unit transmits the information using a wireless signal having a same frequency band as a frequency band of an electromagnetic wave which the power receiving unit uses for receiving the electric power.

10. The power reception apparatus according to claim 1, wherein the transmission unit transmits the information for requesting the power transmission apparatus to stop power transmission before the load unit is detached from the power reception apparatus.

11. A method for controlling a power reception apparatus, the method comprising:
detecting that a member that is included in the power reception apparatus and that is capable to be in at least a first state for attachment and detachment of a load unit and a second state restricting the attachment and detachment of the load unit will be turned into the first state, wherein the load unit is capable of consuming electric power wirelessly received by the power reception apparatus from a power transmission apparatus in a state where the load unit is attached to the power reception apparatus; and
transmitting information for requesting the power transmission apparatus to stop power transmission when it is detected that the member will be turned into the first state in the detecting while the power reception apparatus is receiving the electric power from the power transmission apparatus and the load unit is consuming the electric power received by the power reception apparatus.

12. The control method according to claim 11, wherein the information is transmitted in the transmitting using a wireless signal having a same frequency band as a frequency band of an electromagnetic wave used by the power reception apparatus to receive the electric power.

13. The control method according to claim 11, wherein, the information for requesting the power transmission apparatus to stop power transmission is transmitted in the transmitting before the load unit is detached from the power reception apparatus.

14. A non-transitory computer readable storage medium storing a program which, when executed, causes a computer to implement a method for controlling a power reception apparatus, the method comprising:
detecting that a member that is included in the power reception apparatus and that is capable to be in at least a first state for attachment and detachment of a load unit and a second state restricting the attachment and detachment of the load unit will be turned into the first state, wherein the load unit is capable of consuming electric power wirelessly received by the power reception apparatus from a power transmission apparatus in a state where the load unit is attached to the power reception apparatus; and
transmitting information for requesting the power transmission apparatus to stop power transmission when it is detected that the member will be turned into the first state in the detecting while the power reception apparatus is receiving the electric power from the power transmission apparatus and the load unit is consuming the electric power received by the power reception apparatus.

15. A power reception apparatus comprising:
a power receiving unit configured to receive electric power wirelessly supplied from a power transmission apparatus;
a member capable of being in at least a first state for attachment and detachment of a load unit and a second state restricting the attachment and detachment of the load unit, wherein the load unit can consume the electric power received by the power receiving unit in a state in which the load unit is attached to the power reception apparatus;
a detection unit configured to detect that the member is in the first state; and
a transmission unit configured to transmit information for requesting the power transmission apparatus to stop power transmission when the detection unit detects that the member is in the first state while the power receiving unit is receiving the electric power from the power transmission apparatus and the load unit is consuming the electric power received by the power receiving unit.

* * * * *